United States Patent [19]

Vis

[11] 4,197,431
[45] Apr. 8, 1980

[54] SUBSCRIBER LOOP FEED APPARATUS

[75] Inventor: Herman Vis, Santa Rosa, Calif.

[73] Assignee: Digital Telephone Systems, Inc., Novato, Calif.

[21] Appl. No.: 947,726

[22] Filed: Oct. 2, 1978

[51] Int. Cl.² .................. H04M 19/08; H04B 1/58
[52] U.S. Cl. ................................ 179/70; 179/16 F; 179/170 R
[58] Field of Search .......... 179/16 A, 16 AA, 16 F, 179/70, 77, 170 G, 170 NC, 18 F, 18 FA, 78 R, 80, 170 R; 333/80 R, 80 T, 213, 216, 217

[56] References Cited

U.S. PATENT DOCUMENTS

| 2,835,740 | 5/1958  | Heetman   | 179/18 FA |
| 3,042,816 | 7/1962  | Aagaard   | 179/18 FA |
| 3,828,146 | 8/1974  | Lewis     | 179/170 NC |
| 3,911,372 | 10/1975 | Seidel    | 330/124 R |
| 3,916,110 | 10/1975 | Lee et al. | 179/16 F |
| 3,993,880 | 11/1976 | O'Neill   | 179/70 |
| 4,004,104 | 1/1977  | Picandet et al. | 179/16 F |

FOREIGN PATENT DOCUMENTS 1762356  4/1970  Fed. Rep. of Germany ...... 179/18 FA

OTHER PUBLICATIONS

J. Atkinson, "Telephony," 1948, British Post Office Publication, TK6161 H57, pp. 75-79.

*Primary Examiner*—Bernard Konick
*Assistant Examiner*—Randall P. Myers
*Attorney, Agent, or Firm*—Limbach, Limbach & Sutton

[57] ABSTRACT

Telephone loop feed apparatus in which a hybrid couples audio signals to and from the subscriber loop and presents a high impedance to the loop relative to the loop impedance. DC power is coupled to the loop by matched resistors which determine the loop feed matching resistance. DC power is blocked from the hybrid to avoid saturation.

8 Claims, 4 Drawing Figures

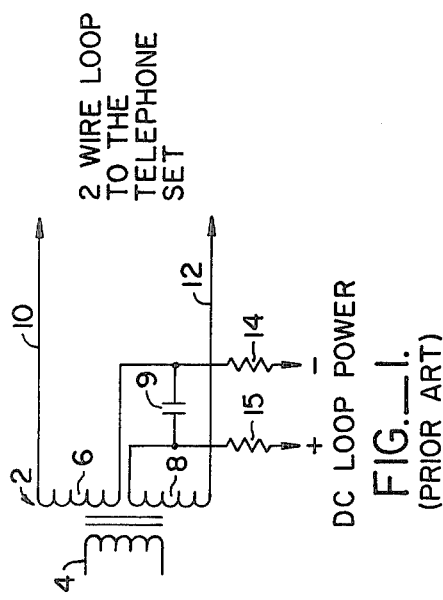
FIG.—1.
(PRIOR ART)
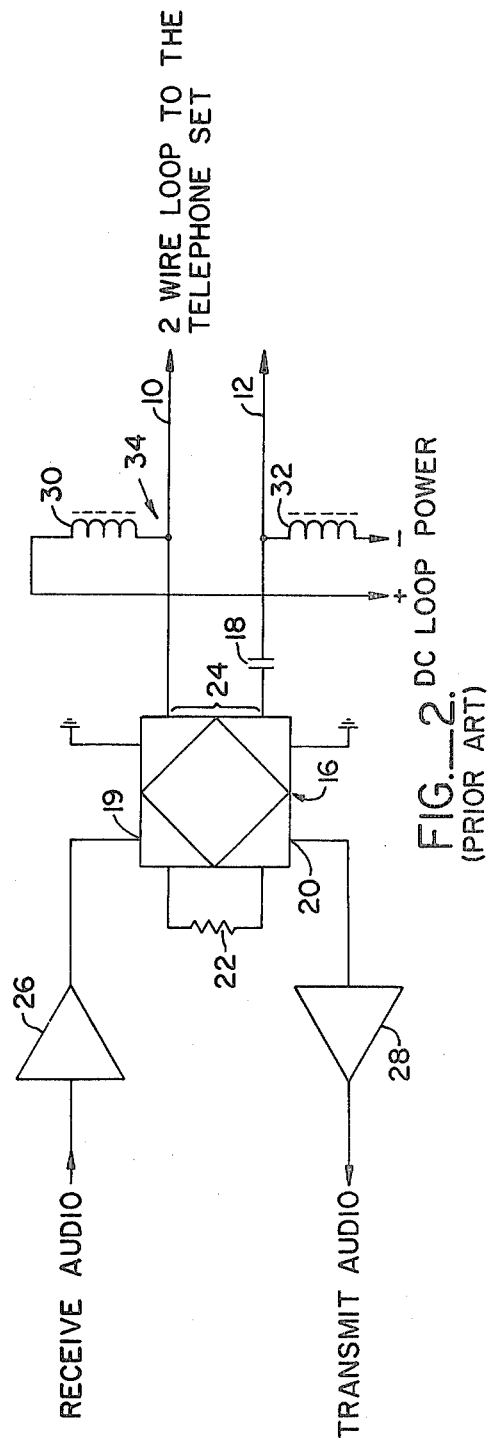
FIG.—2.
(PRIOR ART)

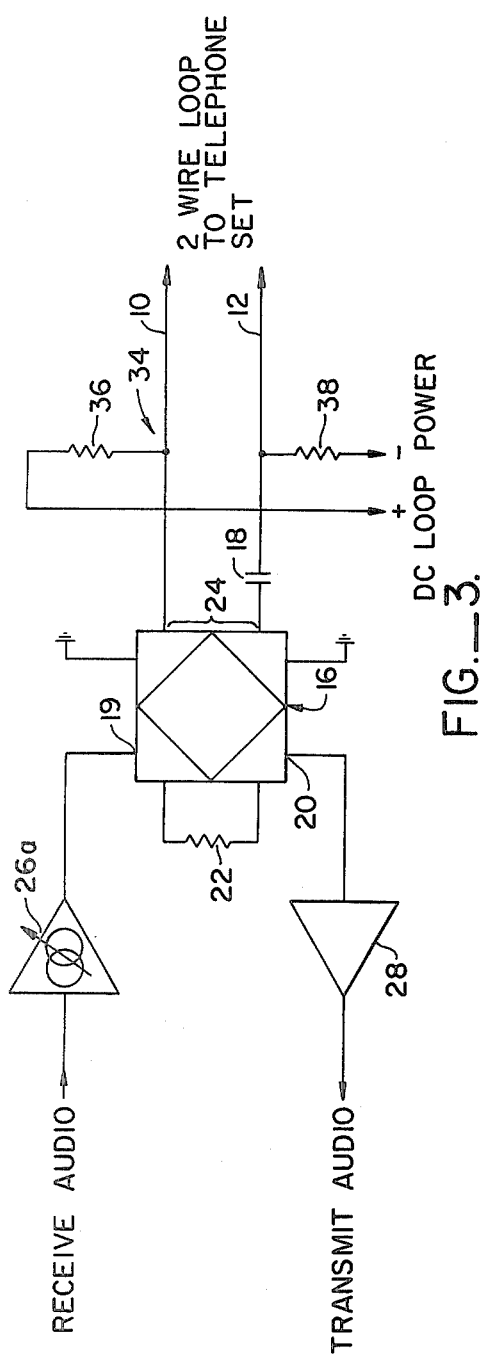
FIG._3.
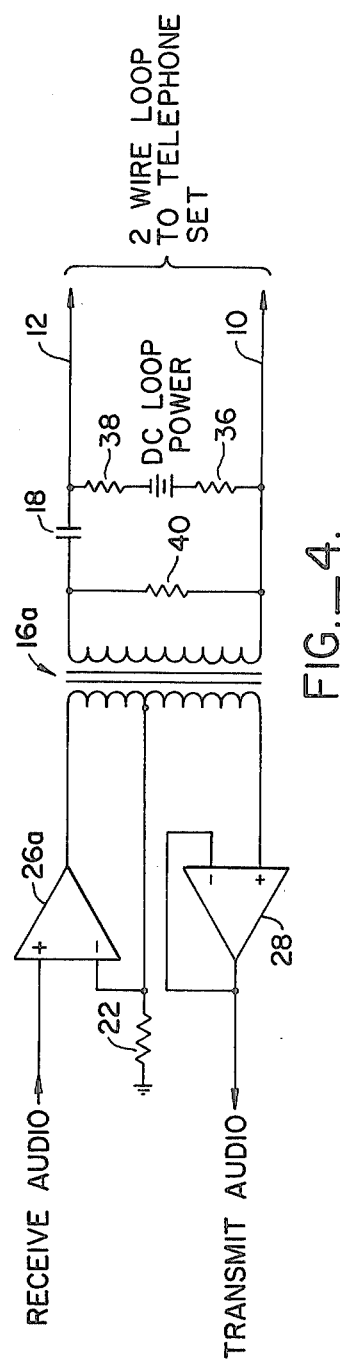
FIG._4.

SUBSCRIBER LOOP FEED APPARATUS

BACKGROUND OF THE INVENTION

The invention relates generally to telephone transmission systems and in particular to novel apparatus for feeding a telephone subscriber loop.

Telephone systems typically employ balanced twisted wire pairs for audio transmission to and from subscriber telephone sets. Such twisted pairs are referred to as subscriber line loops. The characteristics of the twisted wires is such that telephone circuits are usually designed to match a 600Ω AC impedance for the audio signals to minimize standing waves which cause undesirable echoes. In addition to audio, DC power is carried on the same twisted pair to power the telephone set and to provide various signalling information (busy, idle, etc.). Nominal impedances other than 600Ω are encountered in subscriber loops served by telephone central offices, and in practice the actual loop impedance may vary from the nominal impedance.

Thus, the feed point end of the subscriber loop, i.e., the end remote from the subscriber telephone set, requires a circuit that couples audio in and out of the two wire pair as well as DC power. The audio and DC must not interfere with each other and an AC impedance match to the loop is required.

Most prior art loop feed arrangements include a hybrid transformer for coupling the audio signals to and from the subscriber loop. In one widely used prior art arrangement, known as a "new hybrid", the DC loop power is applied through the hybrid transformer windings such as in FIG. 1. Such an arrangement requires a large transformer core due to the high saturation resulting from the large DC current carried.

A variation of the "wet hybrid" arrangement is a loop feed in which the size of the hybrid is substantially reduced by blocking the DC current from reaching the hybrid, thus requiring the hybrid to handle only relatively low level audio signals. In this arrangement, shown generally in FIG. 2, the DC loop power is applied through two inductors which present a relatively low DC resistance, so as not to increase substantially the DC power requirements. The AC impedance presented to the subscriber loop is determined primarily by the terminating impedances seen by the transmit and receive ports of the hybrid and the hybrid balance network. The inductors' AC impedance is sufficiently higher than the loop impedance so that they have negligible effect. A disadvantage of this approach is that the physical size of the inductors is large making it difficult to provide a multiplicity of loop feed circuits in a small physical package. Also such inductors are expensive, adding to the overall cost of the system.

Another type of prior art line feed circuit employs a hybrid transformer and a pair of DC current regulators to apply DC loop power. This approach is relatively expensive and the current regulators are difficult to balance.

In a further type of prior art line feed circuit, an electronic hybrid employing operational amplifiers is provided. High valued resistors are used to feed DC power to the line. However, such resistors require a higher than standard voltage DC source to provide enough current to drive longer loops.

SUMMARY OF THE INVENTION

In accordance with the present invention, the advantages of hybrid audio coupling to the subscriber loop feed are maintained while eliminating the large space consuming inductors heretofore used to couple DC power to the subscriber loop. The novel loop feed arrangement utilizes non-inductive resistive feed to provide a compact, very inexpensive, effective subscriber loop feed without the disadvantages of the prior art described above.

As discussed above, the impedance seen by the subscriber loop looking into the hybrid is dependent on the transmit and receive port terminations and the balance network. In the inductive feed system described (FIG. 2), the matching impedance is determined by the impedance looking into the hybrid. This result is achieved by employing a low output impedance device to drive the receive audio port which is seen at the two wire hybrid input.

In order to minimize the value of the DC power feed resistors, so as to feed the longest possible loop, the impedance seen by the loop looking into the hybrid must be high. This is accomplished by providing a high output impedance current source device connected to the receive audio port. Thus, the subscriber loop feed impedance is determined essentially solely by the feed resistors, the value of each which can approach one half the desired line feed impedance.

These and other advantages of the invention will be best understood as the following detailed description is read in connection with the drawings.

BRIEF DESCRIPTION OF THE DRAWINGS

FIG. 1 is a schematic circuit diagram of a portion of a prior art loop feed arrangement.

FIG. 2 is a partially block, schematic circuit diagram showing a further prior art loop feed arrangement.

FIG. 3 is a partially block, schematic circuit diagram of a preferred embodiment of the present invention.

FIG. 4 is a partially block, schematic circuit diagram of a preferred embodiment of the present invention.

DETAILED DESCRIPTION OF THE PREFERRED EMBODIMENT

In order to more fully appreciate the present invention, the prior art arrangements of FIGS. 1 and 2 will first be described. Throughout these figures and FIG. 3, the same reference numerals are used for like elements.

FIG. 1 shows schematically a portion of a widely used prior art loop feed system of the "wet hybrid" type. Transformer 2 forms a portion of a hybrid, which is not shown in its entirety for simplicity. Winding 4 is coupled to the audio source and receptor. Windings 6 and 8 couple to the subscriber loop lines 10 and 12, respectively, and to the DC loop power source through load resistors 14 and 15, whose values depend on the loop length. Values of 200Ω each are typical. In the United States, the DC loop power source is usually a −48 volt battery. Because windings 6 and 8 carry the DC loop current, the core of transformer 2 must be large to avoid saturation. Capacitor 9 provides AC continuity so that the two wire loop "sees" a single winding comprising windings 6 and 8 in series.

In FIG. 2, a conventional hybrid transformer, shown schematically at 16, carries only audio signals and a DC blocking capacitor 18 provides isolation from the DC loop power source. Many hybrid configurations are known, all functioning in generally the same way. Audio at the "receive" audio port 6 is cancelled and does not appear at the "transmit" audio port 20. A balancing network, which can in a simple case be a single resistor 22, acts in combination with the terminating impedances at ports 19 and 20 to determine the impedance seen at the two wire port 24. Receive audio (audio received from a source which is to be applied to the subscriber loop) is applied via a voltage amplifier 26. Transmit audio (audio received from the subscriber loop) is received from a voltage amplifier 28 having its input connected to the transmit port 20. DC loop power is applied to lines 10 and 12 through inductors 30 and 32 which each have a DC resistance suitable to act as load resistors, in the order of 200Ω each. The AC impedance of inductors 30 and 32 is much higher than the nominal loop impedance, hence the loop matching impedance at the loop feed point can be determined by the hybrid 16 terminations. In practice, the inductors 30 and 32 have a typical inductance in the order of 2 to 5 henries, requiring a relatively large physical size in apparatus which otherwise comprises extremely compact components.

FIG. 3 shows schematically the improved loop feed apparatus of the present invention, in which the large inductors 30, 32 are replaced by simple non-inductive resistors 36 and 38 and in which the impedance seen by the subscriber loop at the two wire port is high relative to the subscriber loop impedance so that the line matching impedance at the feed point 34 is determined by the resistors 36, 38.

Resistors 36 and 38 are matched and each is substantially half the nominal subscriber loop impedance, thus providing an impedance match at the feed point to the loop.

In order to provide a high impedance at the two wire port 24, the low output impedance voltage amplifier 26 is replaced by a high output impedance current amplifier 26a.

FIG. 4 shows another schematic diagram of the apparatus of the present invention. For maximum current transfer to the loop, the sum of the resistance value of resistors 36 and 38 is chosen to be approximately equal to the line impedance. If less current drive to the loop is required, the resistance values of resistors 36 and 38 is increased and resistor 40 is finite, so that the series-parallel combination of resistors 36, 38 and 40 is approximately equal to the line impedance. Thus, the invention provides for considerable flexibility in meeting loop current requirements while maintaining a good impedance match.

I claim:

1. In a telephone system, apparatus for applying DC power from a source and for coupling audio signals to and from a two wire loop having a nominal characteristic impedance, comprising
   means for connecting said source of DC power to said two wire loop at its feed point, said means including first and second non-inductive resistance means connected respectively between one wire of said two wire loop and one pole of said source of DC power, the value of each of said resistance means being substantially equal to half of the resistive component of said nominal characteristic impedance,
   means for coupling audio signals to and from said two wire loop, said means presenting an impedance to said two wire loop dependent on the impedance presented to said coupling means,
   means, including DC blocking means, for connecting said two wire loop at its feed point to said coupling means,
   means for connecting audio signals to be applied to said two wire loop to said coupling means, said means presenting a high impedance to said coupling means, and
   means for transmitting from said coupling means audio signals received from said two wire loop, said means presenting a high impedance to said coupling means, whereby the loop matching impedance is determined principally by said non-inductive resistance means.

2. The combination of claim 1 wherein said means for coupling audio signals comprises means including a hybrid transformer.

3. The combination of claim 2 wherein said hybrid transformer includes connections for said two wire loop and mutually exclusive transmit and receive ports for a four wire line.

4. The combination of claim 3 wherein said DC blocking means comprises a DC blocking capacitor.

5. The combination of claim 4 wherein said telephone system is a two wire system and said nominal characteristic impedance is in the order of 600 to 900Ω.

6. The combination of claim 3 wherein said means for connecting audio signals to said hybrid transformer comprises a current amplifier receiving said audio signals at its input.

7. The combination of claim 1 wherein said DC blocking means comprises a DC blocking capacitor.

8. The combination of claim 1 wherein said means for connecting audio signals to said coupling means comprises a current amplifier receiving said audio signals at its input.

* * * * *

UNITED STATES PATENT AND TRADEMARK OFFICE
CERTIFICATE OF CORRECTION

PATENT NO. : 4,197,431
DATED : Apr. 8, 1980
INVENTOR(S) : Herman Vis

It is certified that error appears in the above–identified patent and that said Letters Patent are hereby corrected as shown below:

In column 1, line 33, "new hybrid" should be --wet hybrid--

Signed and Sealed this

Eighth Day of July 1980

[SEAL]

*Attest:*

SIDNEY A. DIAMOND

*Attesting Officer*  *Commissioner of Patents and Trademarks*